United States Patent
Swain et al.

(10) Patent No.: US 12,363,443 B2
(45) Date of Patent: Jul. 15, 2025

(54) METHOD AND SYSTEM FOR ZONE-WISE ADAPTIVE ILLUMINATION OF OBJECTS

(71) Applicant: Tata Consultancy Services Limited, Mumbai (IN)

(72) Inventors: Amit Swain, Kolkata (IN); Arindam Ray, Kolkata (IN); Tapas Chakravarty, Kolkata (IN); Chirabrata Bhaumik, Kolkata (IN); Smriti Rani, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 122 days.

(21) Appl. No.: 18/054,832

(22) Filed: Nov. 11, 2022

(65) Prior Publication Data

US 2023/0171505 A1    Jun. 1, 2023

(30) Foreign Application Priority Data

Nov. 29, 2021  (IN) .............................. 202121055198

(51) Int. Cl.
*H04N 23/71*    (2023.01)
*H04N 23/74*    (2023.01)

(52) U.S. Cl.
CPC ............. *H04N 23/74* (2023.01); *H04N 23/71* (2023.01)

(58) Field of Classification Search
CPC ........ H04N 23/74; H04N 23/71; H04N 5/272; H04N 23/56; H04N 23/61; H04N 23/555;

(Continued)

(56) References Cited

U.S. PATENT DOCUMENTS 10,331,956 B2    6/2019    Solar et al.
10,783,610 B2    9/2020    Tafazoli Bilandi et al.

(Continued)

OTHER PUBLICATIONS

M. Ataei, "Blast fragmentation analysis using image processing", IJMGE, vol. 50, No. 2, (2016) 211â218 (Year: 2016).*

(Continued)

*Primary Examiner* — Jamie J Atala
*Assistant Examiner* — Mahmoud Kamal Abouzahra
(74) *Attorney, Agent, or Firm* — Finnegan, Henderson, Farabow, Garrett & Dunner, LLP

(57) ABSTRACT

Lighting conditions affect quality of images being captured. In traditional systems, illuminators (light sources) are used to illuminate the objects without considering illumination levels at different zones/sides of an object being photographed. As a result, all illuminators may run at maximum capacity, resulting in wastage of power and compromising efficiency of the system. The disclosure herein generally relates to illumination of objects, and, more particularly, to a method and system for adaptive illumination of objects. The system determines illumination at different zones of the object, and further identifies zones that are not illuminated properly in comparison with a threshold of illumination. Further the system controls intensity of only the illuminators which are responsible for illumination of the zones in which measured illumination is below a threshold of illumination, and increases the intensity by a value determined based on difference between measured illumination and the threshold of illumination, for each zone.

9 Claims, 6 Drawing Sheets

(58) Field of Classification Search
CPC . G06T 2207/10152; G06T 2207/20021; G06T 2207/20081; G06T 2207/20084; G06T 2207/20112; G06T 7/0002; G06V 10/141; G06V 10/443
USPC ......................................................... 348/164
See application file for complete search history.

(56) References Cited

U.S. PATENT DOCUMENTS

| | | | |
|---|---|---|---|
| 2016/0065864 A1* | 3/2016 | Guissin | G06T 5/20 348/239 |
| 2021/0112647 A1* | 4/2021 | Coleman | G01S 17/42 |

OTHER PUBLICATIONS

M. Ataei, Blast fragmentation analysis using image processing, 2016, International Journal of Mining and Geo-Engineering, IJMGE, vol. 50, No. 2, (2016) 211-218 (Year: 2016).*

Author: Ujjwal Kumar1 and Ayesha Shaik Title: Blast fragmentation analysis using image processing Title of the item: Machine Learning Date: 2016 Publisher: IOP Science Link: https://www.researchgate.net/publication/348450689_Blast_Fragmentation_Analysis_using_Image_Processing/link/600059d8299bf1408893fce2/download.

* cited by examiner

METHOD AND SYSTEM FOR ZONE-WISE ADAPTIVE ILLUMINATION OF OBJECTS

PRIORITY CLAIM

This U.S. patent application claims priority under 35 U.S.C. § 119 to: Indian Patent Application number 202121055198, filed on Nov. 29, 2021. The entire contents of the aforementioned application are incorporated herein by reference.

TECHNICAL FIELD

The disclosure herein generally relates to illumination of objects, and, more particularly, to a method and system for adaptive illumination of objects.

BACKGROUND

Applications which involve capturing and processing of images of objects to perform analysis and other tasks require the images to have certain quality levels. Lighting/illumination is a critical factor directly impacting quality of captured images. Images captured in low light conditions typically have low quality, and images captured under sufficiently illuminated conditions typically have comparatively better quality.

However, illumination is a challenge in many scenarios. An example scenario is fragmentation analysis carried out in underground mines. The underground mines pose a challenge to deployment of vision-based fragmentation analysis systems as it is a poorly-lit and is a constrained environment. Furthermore, state of the art computer vision solutions for fragmentation analysis have not been able to address the case of precise segmentation of overlapping ore particles, and with poor illumination and poor quality of acquired images, this task becomes even more challenging.

SUMMARY

Embodiments of the present disclosure present technological improvements as solutions to one or more of the above-mentioned technical problems recognized by the inventors in conventional systems. For example, in one embodiment, a processor implemented method for adaptive illumination of an object is provided. In this method, initially at least one image of an object is obtained via one or more hardware processors, wherein the at least one image is captured when the object is illuminated by a plurality of Infrared (IR) illuminators from an IR illuminator array. The at least one image is then pre-processed via the one or more hardware processors, wherein the pre-processing comprises of a) adjusting contrast, and b) performing normalization, of one or more frames captured in the at least one image. Further, a semantic segmentation of pre-processed at least one image is performed via the one or more hardware processors, to extract foreground (FG) data and background (BG) data of the at least one image. Further, a binary semantic mask of the at least one image is generated, via the one or more hardware processors, wherein the binary semantic mask comprises information on the extracted BG data and the FG data of the at least one image. Further, an Edge based Structural Similarity Index Metric (ESSIM) matrix is constructed from the binary semantic mask, via the one or more hardware processors, wherein the ESSIM indicates a measured illuminance of each of a plurality of zones in at least one Region of Interest (RoI) of the object, in terms of a) luminance, b) contrast, and c) one or more edge comparison functions. Further, it is determined via the one or more hardware processors, whether the measured illuminance of each of the plurality of zones of the object at least matches a threshold of illuminance. Then intensity of one or more of the plurality of illuminators is varied to improve the illuminance of each of the plurality of zones for which the measured illuminance is below the threshold of illuminance, to at least match the threshold of illuminance.

In another aspect, varying the intensity of one or more of the plurality of illuminators involves the following steps. Initially, one or more of the plurality of illuminators corresponding to each of the plurality of zones for which the measured illuminance is below the threshold of illuminance are identified, based on a mapping of each of the plurality of zones with the corresponding one or more illuminators. Further, extent to which the intensity of each of the identified one or more illuminators is required to be varied to improve the illumination in the corresponding zone to at least match the threshold of illuminance is determined. Further, a control signal is generated to vary the intensity of the one or more of the plurality of illuminators, based on the determined extent to which the intensity of each of the identified one or more illuminators is required to be varied. Then using the control signal, the intensity of each of the identified one or more illuminators is varied.

In yet another aspect, a system for adaptive illumination of an object is provided. The system includes one or more hardware processors, a communication interface, and a memory storing a plurality of instructions. The plurality of instructions when executed, cause the one or more hardware processors to perform the following steps for the targeted illumination. Initially at least one image of an object is obtained via one or more hardware processors, wherein the at least one image is captured when the object is illuminated by a plurality of Infrared (IR) illuminators from an IR illuminator array. The at least one image is then pre-processed via the one or more hardware processors, wherein the pre-processing comprises of a) adjusting contrast, and b) performing normalization, of one or more frames captured in the at least one image. Further, a semantic segmentation of pre-processed at least one image is performed via the one or more hardware processors, to extract foreground (FG) data and background (BG) data of the at least one image. Further, a binary semantic mask of the at least one image is generated, via the one or more hardware processors, wherein the binary semantic mask comprises information on the extracted BG data and the FG data of the at least one image. Further, an Edge based Structural Similarity Index Metric (ESSIM) matrix is constructed from the binary semantic mask, via the one or more hardware processors, wherein the ESSIM indicates a measured illuminance of each of a plurality of zones in at least one Region of Interest (RoI) of the object, in terms of a) luminance, b) contrast, and c) one or more edge comparison functions. Further, it is determined via the one or more hardware processors, whether the measured illuminance of each of the plurality of zones of the object at least matches a threshold of illuminance. Then intensity of one or more of the plurality of illuminators is varied to improve the illuminance of each of the plurality of zones for which the measured illuminance is below the threshold of illuminance, to at least match the threshold of illuminance.

In yet another aspect, the one or more hardware processors in the system are configured to vary the intensity of one or more of the plurality of illuminators by executing the following steps. Initially, one or more of the plurality of illuminators corresponding to each of the plurality of zones for which the measured illuminance is below the threshold of illuminance are identified, based on a mapping of each of the plurality of zones with the corresponding one or more illuminators. Further, extent to which the intensity of each of the identified one or more illuminators is required to be varied to improve the illumination in the corresponding zone to at least match the threshold of illuminance is determined. Further, a control signal is generated to vary the intensity of the one or more of the plurality of illuminators, based on the determined extent to which the intensity of each of the identified one or more illuminators is required to be varied. Then using the control signal, the intensity of each of the identified one or more illuminators is varied.

In yet another aspect, a non-transitory computer readable medium for adaptive illumination of an object is provided. The non-transitory computer readable medium includes a plurality of instructions, which when executed, cause the following steps. Initially at least one image of an object is obtained via one or more hardware processors, wherein the at least one image is captured when the object is illuminated by a plurality of Infrared (IR) illuminators from an IR illuminator array. The at least one image is then pre-processed via the one or more hardware processors, wherein the pre-processing comprises of a) adjusting contrast, and b) performing normalization, of one or more frames captured in the at least one image. Further, a semantic segmentation of pre-processed at least one image is performed via the one or more hardware processors, to extract foreground (FG) data and background (BG) data of the at least one image. Further, a binary semantic mask of the at least one image is generated, via the one or more hardware processors, wherein the binary semantic mask comprises information on the extracted BG data and the FG data of the at least one image. Further, an Edge based Structural Similarity Index Metric (ESSIM) matrix is constructed from the binary semantic mask, via the one or more hardware processors, wherein the ESSIM indicates a measured illuminance of each of a plurality of zones in at least one Region of Interest (RoI) of the object, in terms of a) luminance, b) contrast, and c) one or more edge comparison functions. Further, it is determined via the one or more hardware processors, whether the measured illuminance of each of the plurality of zones of the object at least matches a threshold of illuminance. Then intensity of one or more of the plurality of illuminators is varied to improve the illuminance of each of the plurality of zones for which the measured illuminance is below the threshold of illuminance, to at least match the threshold of illuminance.

In yet another aspect, the non-transitory computer readable medium varies the intensity of one or more of the plurality of illuminators by executing the following steps. Initially, one or more of the plurality of illuminators corresponding to each of the plurality of zones for which the measured illuminance is below the threshold of illuminance are identified, based on a mapping of each of the plurality of zones with the corresponding one or more illuminators. Further, extent to which the intensity of each of the identified one or more illuminators is required to be varied to improve the illumination in the corresponding zone to at least match the threshold of illuminance is determined. Further, a control signal is generated to vary the intensity of the one or more of the plurality of illuminators, based on the determined extent to which the intensity of each of the identified one or more illuminators is required to be varied. Then using the control signal, the intensity of each of the identified one or more illuminators is varied.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
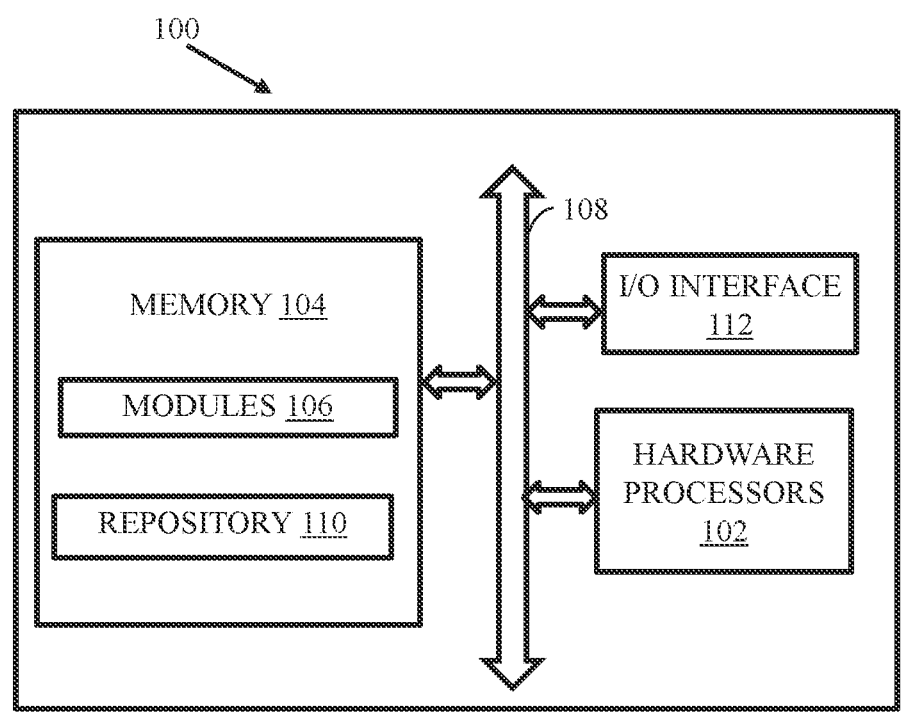
FIG. 1 illustrates an exemplary system for adaptive illumination of an object, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Quality of images improves when the images are captured under ample lighting. In the absence of sufficient natural light, artificial lighting option is used to illuminate the object. For example, an illumination setup similar to that in FIG. 4A and FIG. 4B can be used for illuminating the objects. As in FIG. 4A and FIG. 4B, suitable light source such as Infrared (IR) illuminators, positioned at different sides/angles of the object can be used for illuminating the object. However, a disadvantage of the state of the art illumination mechanisms is that they are static in the sense all the light sources operate at maximum power irrespective of the lighting conditions. For example, some sides/parts of the object may have been properly illuminated, and only the remaining sides/parts may have to be illuminated. In another example, all sides/parts may have to be illuminated, but again depending on how well different sides/parts are already illuminated, intensity of the light sources may be varied, improving power saving and efficiency. The static approach used by the state of the art systems fail to perform the adaptive control and illumination of the light sources, resulting in poor lighting, and in turn in poor quality images.

In order to address this issue, the embodiments disclosed herein provide a method and system for adaptive illumination of objects. In this approach, the system 100 determines, by processing one or more images of an object, whether all of a plurality of zones of the object are illuminated to at least meet a threshold of illuminance. If a measured illumination of any of the zones is below the threshold of illumination, then the system 100 selectively varies intensity of one or more illuminators from among a plurality of illuminators, to illuminate only the zones for which the measured illumination is below the threshold of illumination. The illumination of these zones is adjusted to at least match the illumination with the threshold of illumination. The adaptive illumination further helps in achieving targeted illumination i.e. only selected zones are highlighted, and by selectively varying intensity of the IR illuminators.

Referring now to the drawings, and more particularly to FIG. 1 through FIG. 4B, where similar reference characters denote corresponding features consistently throughout the figures, there are shown preferred embodiments and these embodiments are described in the context of the following exemplary system and/or method.

FIG. 1 illustrates an exemplary system for adaptive illumination of an object, according to some embodiments of the present disclosure. The system 100 includes or is otherwise in communication with hardware processors 102, at least one memory such as a memory 104, and an Input/Output (I/O) interface 112. The hardware processors 102, memory 104, and the I/O interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106. The memory 104 also includes a data repository (or repository) 110 for storing data processed, received, and generated by the plurality of modules 106.

The plurality of modules 106 include programs or coded instructions that supplement applications or functions performed by the system 100 for the adaptive illumination of objects. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the adaptive illumination of objects.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (not shown in FIG. 1) communicatively coupled to the system 100. The data contained within such external database may be periodically updated. For example, new data may be added into the database (not shown in FIG. 1) and/or existing data may be modified and/or non-useful data may be deleted from the database (not shown in FIG. 1). In one example, the data may be stored in an external system, such as a Lightweight Directory Access Protocol (LDAP) directory and a Relational Database Management System (RDBMS).

Figure 2A:
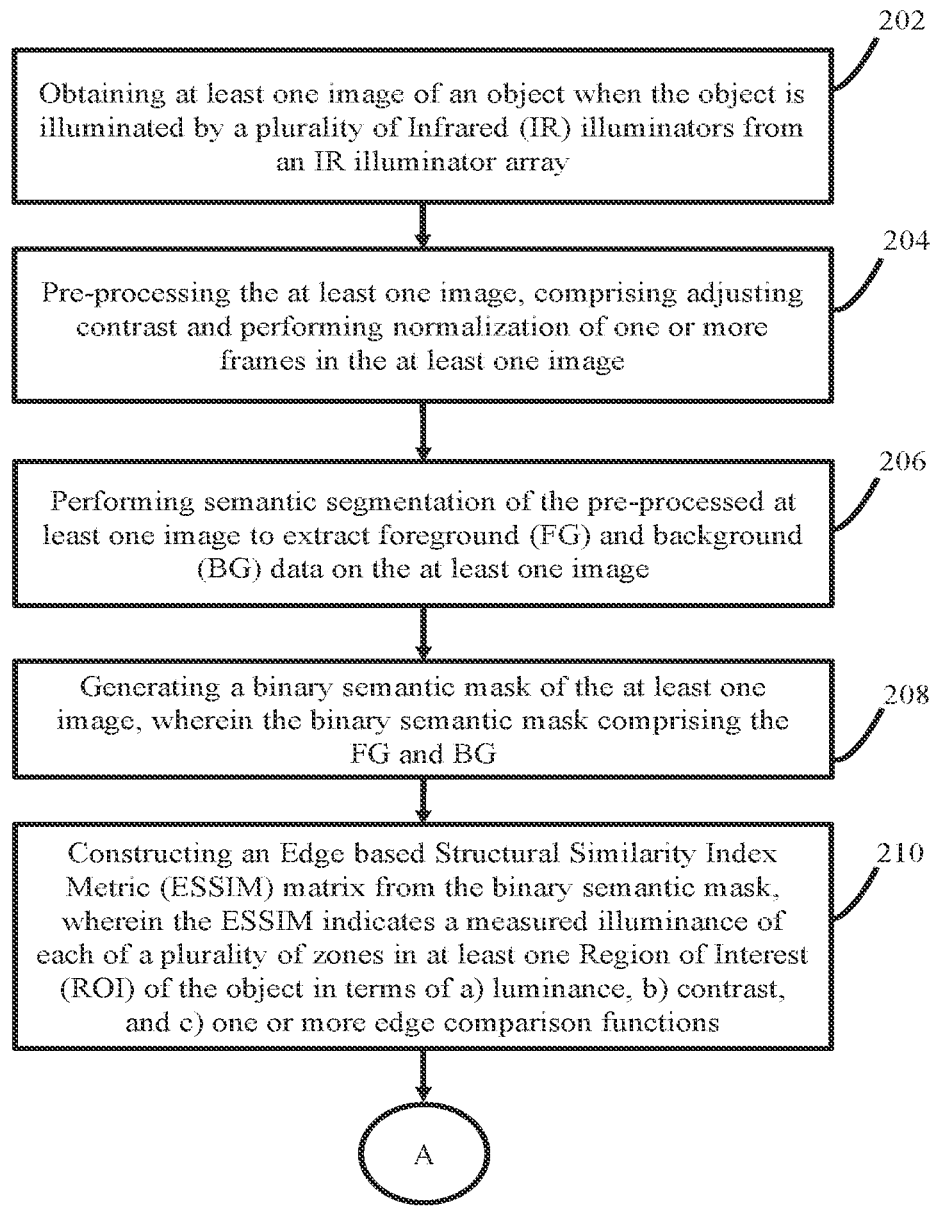
FIGS. 2A and 2B (collectively referred to as FIG. 2) illustrate a flow diagram depicting steps involved in the process of adaptive illumination of the object, by the system of FIG. 1, according to some embodiments of the present disclosure.
Figure 2B:
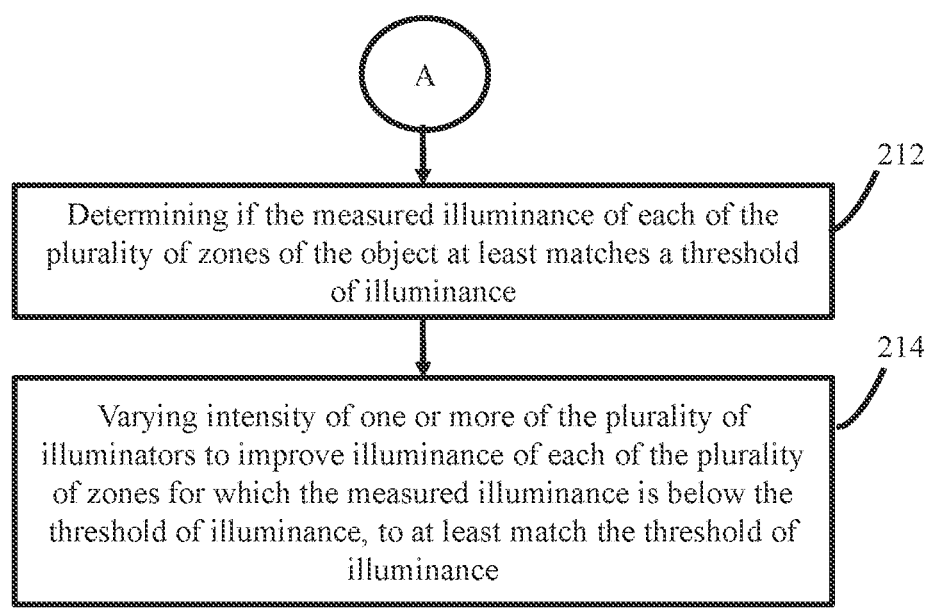
Figure 3:
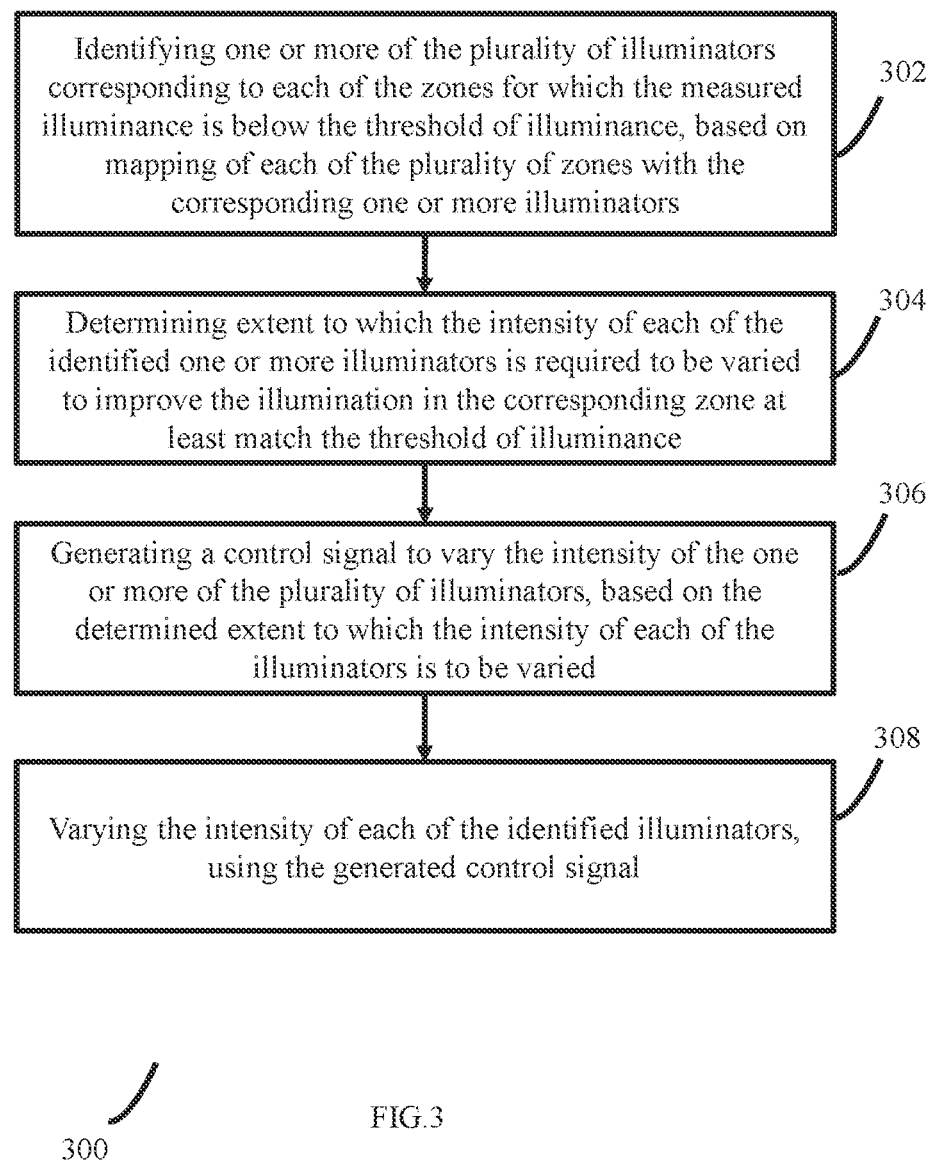
FIG. 3 is a flow diagram illustrating steps involved in the process of varying intensity of one or more Infrared (IR) illuminators for the adaptive illumination, by the system of FIG. 1, in accordance with some embodiments of the present disclosure.

Steps involved in the process of adaptive illumination of objects, being performed by the system 100, are depicted in FIG. 2 and FIG. 3. The steps in FIG. 2 and FIG. 3 are explained with reference to the components of the system 100 as depicted in FIG. 1.

FIGS. 2A and 2B (collectively referred to as FIG. 2, and method 200) illustrate a flow diagram depicting steps involved in the process of adaptive illumination of the object, by the system of FIG. 1, according to some embodiments of the present disclosure.

Figure 4A:
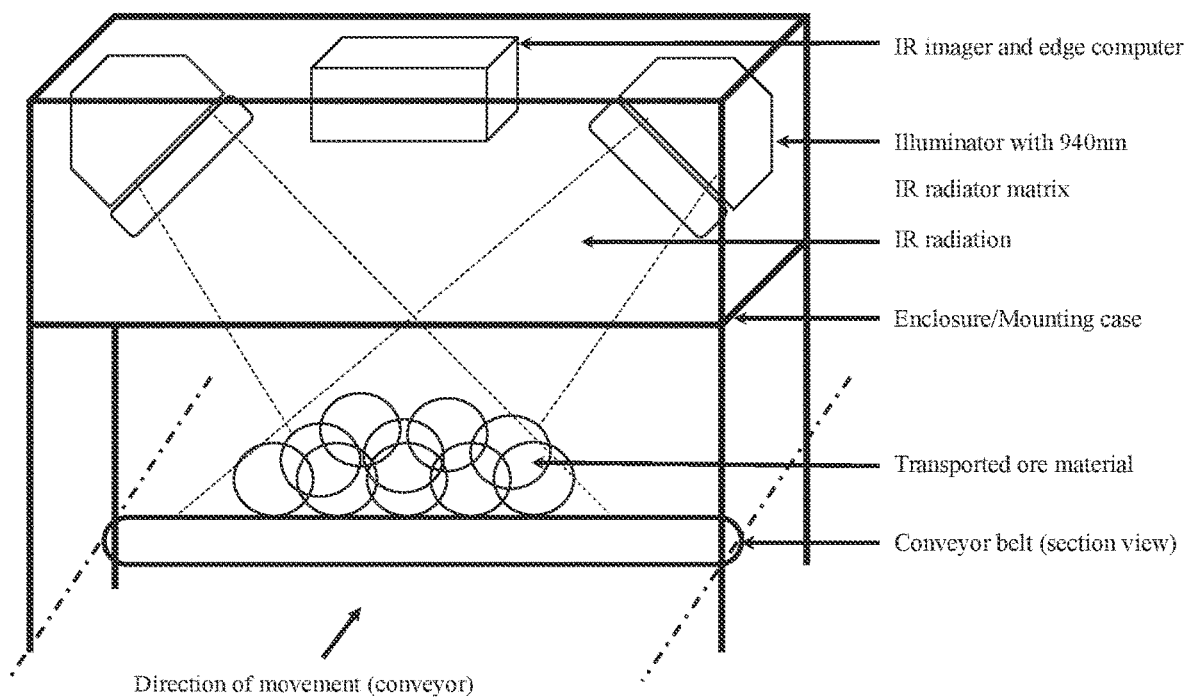
FIGS. 4A and 4B (collectively referred to as FIG. 4) illustrate an example implementation of the system of FIG. 1 for adaptive illumination in a fragmentation analysis use-case, in accordance with some embodiments of the present disclosure.
Figure 4B:
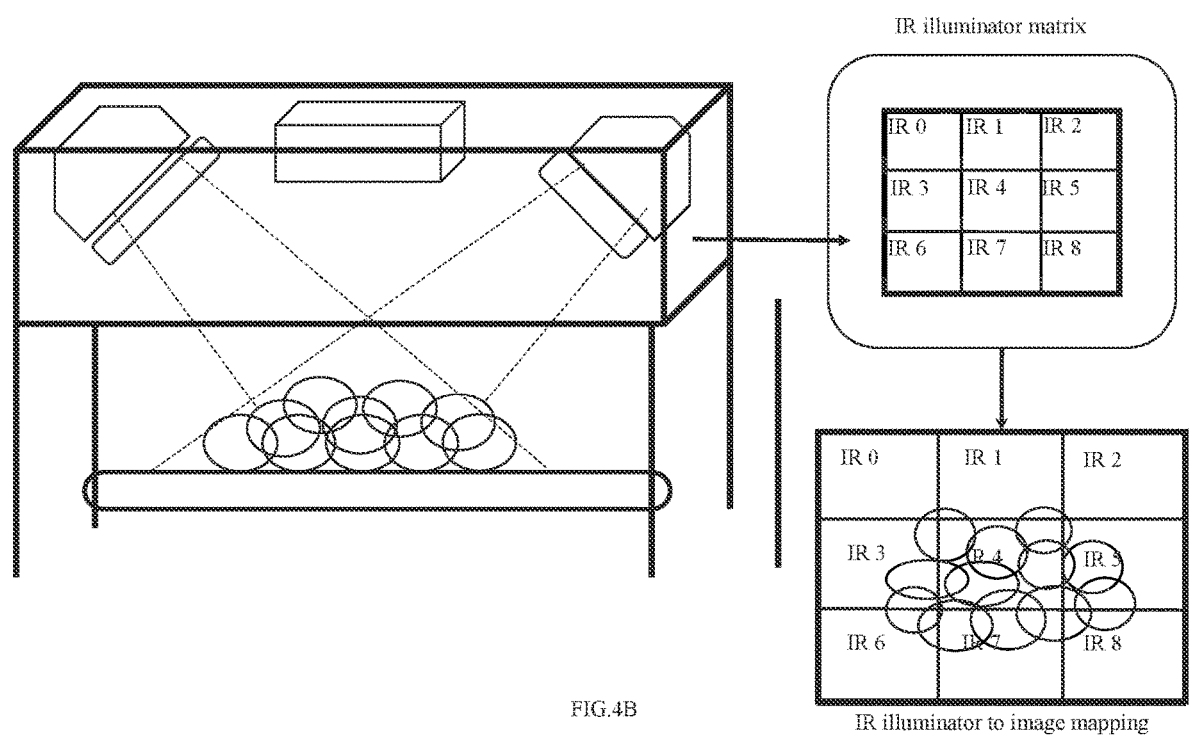

Consider an illumination setup (alternately referred to as "setup") which is used for illuminating objects. For the purpose of explanation, the setup as in FIGS. 4A and 4B is considered. In this setup, an array of Infrared (IR) illuminators is used. The array of IR illuminators includes a plurality of IR illuminators/emitters (total 9 from IR 0 to IR 8 in this setup, as depicted in FIG. 4B), such that the IR illuminators are positioned such that each of the IR illuminators Illuminate different zones of the object. The term "zone" in the context of the embodiments disclosed herein may refer to different parts/sides (for example, front, back, and so on) of the object. The object is placed on a conveyor belt which may or may not be moving while the one or more images of the object is being taken by an image capturing means i.e. the IR imager in this setup. The captured one or more images are then processed by the system 100 i.e. the edge computer in FIG. 4A. In an embodiment, implementation of the system 100 as the edge computer is only an example. In other modes of implementation, the system 100 may be outside the setup, locally or in a remote location or cloud.

At step 202 of the method 200, the system 100 obtains the at least one image of the object, wherein the at least one image is captured when the object is illuminated by the IR illuminators. However, at this stage all the IR illuminators may be operating at a uniform capacity. Also, the illumination at different zones of the object may not be uniform due to various factors such as but not limited to presence of non-uniform external lighting.

Further, at step 204, the at least one image is pre-processed by the system 100. Pre-processing the at least one image involves adjusting contrast and performing normalization of one or more frames in the at least one image. In an embodiment, the system 100 performs the contrast adjustment based on a perceived contrast quality metric, which may contain a pre-configured value of contrast, and the contrast adjustment at this stage acts as a preliminary adjustment. Performing the normalization involves changing range of pixel intensity values by determining a normalized pixel intensity level for each of a plurality of pixels of the at least one image, to improve quality of the at least one image, for further processing. The system 100 calculates the normalized pixel intensity as:

$$X_i = (x_i - \mu)/\sigma \qquad (1)$$

where, $X_i$ is normalized pixel intensity for $i^{th}$ pixel $x_i$ is current intensity for the $i^{th}$ pixel $\mu$ is mean of all pixel intensities $\sigma$ is standard deviation of all pixel intensities Further, at step 206, the system 100 performs a semantic segmentation of the pre-processed at least one image, and extracts foreground (FG) and background (BG) data from the at least one image. For the semantic segmentation, the system 100 may use a neural network which uses a data model generated using training data comprising a plurality of test images, and corresponding FG and BG data. In an embodiment, any other suitable technique (i.e. other than the neural network based approach) may be used for segregating the FG and BG of the at least one image.

Further, at step 208, the system 100 generates a binary mask of the at least one image. The binary mask includes information on the extracted FG and BG. At this step, the system 100 identifies one or more Region of Interest (RoI) with the FG, based on the data in the binary mask of the at least one image. In an embodiment, the FG data in the binary mask forms the RoI. Further, the system 100 performs a full scale segmentation of all objects in each of the ROIs in the FG of the at least one image. For example, if the at least one image is of a metal ore and when the application is fragmentation analysis, the full scale segmentation helps in identifying impurities such as rock particles in the metal ore. The system 100 may use an artificial neural network based approach for the full scale segmentation, using appropriate neural network technique such as but not limited to U-Net, RCNN, and deeplab. In the fragmentation scenario, the data generated by the full scale segmentation may still contain overlapping un-segmented regions. To address this, the system 100 may be configured to use an additional regional proposal network to determine the bounding boxes and thus assist in segmenting out overlapping/overcrowded regions by intelligently eroding their boundaries. Output of the full scale segmentation may be then annotated with the boulders (anomaly in case of fragmentation analysis) and the output parameters like boulder count, mean particle size are evaluated.

Further, at step 210, the system 100 constructs an Edge based Structural Similarity Index Metric (ESSIM) from the binary semantic mask, wherein the ESSIM indicates a measured illuminance of each of a plurality of zones in at least one Region of Interest (ROI) of the object in terms of a) luminance (L), b) contrast I, and c) one or more edge comparison functions I. This is further explained below:

The system 100 estimates the Luminance (L) as:

$$L(x, y) = (2\mu_x\mu_y + S_1)/(\mu_x^2 + \mu_y^2 + S_1) \qquad (2)$$

The Contrast I is estimated as:

$$C(x, y) = (2\sigma_x\sigma_y + S_2)/(\sigma_x^2 + \sigma_y^2 + S_2) \qquad (3)$$

The one or more edge comparison functions I is estimated as:

$$E(x,y) = (\rho_{xy} + S_3)/(\rho_x\rho_y + S_3) \qquad (4)$$

Where $S_1$, $S_2$, and $S_3$ are constants, which ensure stability when denominator goes to zero and are determined by product of L (dynamic range for pixel values say 255 for standard 8-bit images) and Ki (normal constant) as:

$$S_i = K_i(L) \qquad (5)$$

$\rho_x$ is the standard deviation of edge direction vector, $\rho_{xy}$ is the co-variance of direction vectors corresponding to x and y respectively From the calculated values of L, C, and E, values in the ESSIM are generated as:

$$ESSIM(x,y) = [L(x,y)]^\alpha \cdot [C(x,y)]^\beta \cdot [E(x,y)]^\gamma \qquad (6)$$

where, L is the luminance comparison function, C is the contrast comparison function, E is the edge comparison function, $\alpha$, $\beta$ and $\gamma$ are constants pertaining to relative importance of each function. A, $\beta$ and $\gamma$ can be taken as 1.

The ESSIM converts input ROI into smaller blocks (of say 16×16) and estimates the edge direction histograms and edge comparison function based on a reference image. All the three parameters (L, C and E) are estimated individually and together they comprise the ESSIM, and the value of ESSIM in turn represents a measured illumination of each of the zones. In this case, the edge function of ESSIM is estimated to check whether the edges in the output mask meet the required threshold. As the ESSIM is estimated separately for each of the zones, at step 212, the system 100 compares the value of the ESSIM of each zone with a threshold of illuminance. Each zone is considered to have been sufficiently illuminated if the measured illuminance is at least equal to the threshold of illuminance.

If for any of the zones the measured illuminance is below the threshold of illuminance, at step 214, the system 100 varies intensity of one or more of the plurality of illuminators to improve illuminance of each of the plurality of zones for which the measured illuminance is below the threshold of illuminance, to at least match the threshold of illuminance. Improving the illuminance at this step further improves the contrast that is set during the contrast adjustment at step 204. Steps involved in the process of varying the intensity of the one or more illuminators are depicted in method 300, FIG. 3, and are explained hereafter.

At step 302 of the method 300, the system 100 identifies all illuminators that are responsible for illumination of each of the zones for which the measured illuminance is below the threshold of illuminance. In an embodiment, a mapping of each of the illuminators with corresponding zones is maintained in a database of the system 100. Based on this information the system 100 identifies the illuminator(s) responsible for illumination of each of the zones. Further, at step 304, based on difference between the measured illuminance and the threshold of illuminance for each of the zones, the system 100 determines extent to which illumination of each of the IR illuminators is to be adjusted. The mechanism of determining whether or not to control intensity of each of the IR emitters, based on the difference in the measured illumination and the threshold of illumination serves as a feedback mechanism which allows controlling the intensity of the IR emitters only if necessary i.e. only when the measured illuminance of any of the zones does not match the threshold of illuminance.

Further, at step 306, the system 100 generates a control signal to control the intensity of illumination of the one or more illuminators, to increase/improve the illumination of the corresponding zone of the at least one image to at least match the threshold of illumination. The generated control signal may be a Pulse Width Modulation (PWM) signal. The zone-wise estimated PWM control values are used to vary and adapt the intensity of IR illuminators accordingly at step 308.

Various steps in methods 200 and 300 may be performed in the same order depicted or in any alternate order as may be technically feasible. In another embodiment, one or more steps in methods 200 and 300 may be omitted.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of illumination of objects in low-light conditions. The embodiment, thus provides a mechanism for determining whether or not to control intensity of IR illuminators, based on difference between a zone-wise measured illuminance and a threshold of illuminance. Moreover, the embodiments herein further provide a mechanism to selectively control illumination of one or more of the IR illuminators as required, based on the illumination in respective zones.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for adaptive illumination of an object, comprising:
obtaining at least one image of an object, via one or more hardware processors, wherein the at least one image is captured when the object is illuminated by a plurality of Infrared (IR) illuminators from an IR illuminator array;
pre-processing the at least one image, via the one or more hardware processors, wherein the pre-processing comprises of a) adjusting contrast, and b) performing normalization, of one or more frames captured in the at least one image;

performing a semantic segmentation of pre-processed at least one image, via the one or more hardware processors, to extract foreground (FG) data and background (BG) data of the at least one image;

generating a binary semantic mask of the at least one image, via the one or more hardware processors, wherein the binary semantic mask comprises information on the extracted BG data and the FG data of the at least one image, wherein at least one Region of Interest (RoI) with a FG is identified, based on the data in the binary semantic mask of the at least one image;

performing a full scale segmentation of all objects in each of the ROIs in the FG of the at least one image, via the one or more hardware processors, wherein when the object is an ore material and application is ore fragmentation analysis, then the full scale segmentation identifies impurities as rock particles, and further to address overlapping un-segmented regions, the steps comprise:

determining bounding boxes, using an additional regional proposal network, and segment out overlapping regions by eroding corresponding boundaries, wherein the determined overlapping regions is annotated with boulders, and corresponding parameters pertains to a boulder count, a mean particle size are evaluated;

constructing an Edge based Structural Similarity Index Metric (ESSIM) matrix from the binary semantic mask, via the one or more hardware processors, wherein the ESSIM indicates a measured illuminance of each of a plurality of zones in the at least one Region of Interest (RoI) of the object, in terms of a) luminance (L), b) contrast (I), and c) one or more edge comparison functions (E), wherein the luminance (L) is estimated as: $L(x, y)=(2\mu_x\mu_y+S_1)/(\mu_x^2+\mu_y^2+S_1)$, wherein the contrast (I) is estimated as: $C(x, y)=(2\sigma_x\sigma_y+S_2)/(\sigma_x^2+\sigma_y^2+S_2)$, wherein the one or more edge comparison functions (E) is estimated as: $E(x, y)=(\rho_{xy}+S_3)/(\rho_x\rho_y+S_3)$, wherein $S_1$, $S_2$, and $S_3$ are constants, $\rho_x$ is a standard deviation of edge direction vector, $\rho_{xy}$ is a co-variance of direction vectors corresponding to x and y respectively;

determining, via the one or more hardware processors, whether the measured illuminance of each of the plurality of zones of the object at least matches a threshold of illuminance; and varying, via the one or more hardware processors, intensity of the plurality of illuminators, to improve the illuminance of each of the plurality of zones for which the measured illuminance is below the threshold of illuminance, to at least match the threshold of illuminance, wherein varying the intensity of the plurality of illuminators comprises:

identifying the plurality of illuminators corresponding to each of the plurality of zones for which the measured illuminance is below the threshold of illuminance, based on a mapping of each of the plurality of zones with the corresponding one or more illuminators;

determining extent to which the intensity of each of the identified one or more illuminators is required to be varied to improve the illumination in the corresponding zone of at least one image to at least match the threshold of illuminance, wherein the step of determining whether or not to control intensity of each of the IR emitters, based on a difference in the measured illumination and the threshold of illuminance, serves as a feedback mechanism allowing control of the intensity of the IR emitters only when the measured illuminance of at least one of the zone does not match the threshold of illuminance;

generating a control signal to vary the intensity of the one or more of the plurality of illuminators, based on the determined extent to which the intensity of each of the identified one or more illuminators is required to be varied, wherein zone-wise estimated control signals are used to vary and adapt the intensity of the IR illuminators, and varying the intensity of each of the identified one or more illuminators, using the generated control signal.

2. The method of claim 1, wherein the one or more edge comparison functions indicate whether a plurality of edges of the binary semantic mask match a threshold of mask.

3. The method of claim 1, wherein the ore fragmentation analysis of the ore material is performed after varying the intensity of the one or more illuminators.

4. A system for adaptive illumination of an object, comprising:

one or more hardware processors;

a communication interface; and a memory storing a plurality of instructions, wherein the plurality of instructions when executed, cause the one or more hardware processors to:

obtain at least one image of an object, wherein the at least one image is captured when the object is illuminated by a plurality of Infrared (IR) illuminators from an IR illuminator array;

pre-process the at least one image, wherein pre-processing the at least one image comprises of a) adjusting contrast, and b) performing normalization, of one or more frames captured in the at least one image;

perform a semantic segmentation of pre-processed at least one image to extract foreground (FG) data and background (BG) data of the at least one image;

generate a binary semantic mask of the at least one image, wherein the binary semantic mask comprises information on the extracted BG data and the FG data of the at least one image, wherein at least one Region of Interest (RoI) with a FG is identified, based on the data in the binary semantic mask of the at least one image;

perform a full scale segmentation of all objects in each of the ROIs in the FG of the at least one image, wherein when the object is an ore material and application is ore fragmentation analysis, then the full scale segmentation identifies impurities as rock particles, and further to address overlapping un-segmented regions, the steps comprise:

determine bounding boxes, using an additional regional proposal network, and segment out overlapping regions by eroding corresponding boundaries, wherein the determined overlapping regions is annotated with boulders, and corresponding parameters pertains to a boulder count, a mean particle size are evaluated;

construct an Edge based Structural Similarity Index Metric (ESSIM) matrix from the binary semantic mask, wherein the ESSIM indicates a measured illuminance of each of a plurality of zones in the at least one Region of Interest (RoI) of the object, in terms of a) luminance (L), b) contrast (I), and c) one or more edge comparison functions (E), wherein the luminance (L) is estimated as: $L(x, y)=(2\mu_x\mu_y+S_1)/(\mu_x^2+\mu_y^2+S_1)$, wherein the contrast (I) is estimated as: $C(x, y)=(2\sigma_x\sigma_y+S_2)/(\sigma_x^2+\sigma_y^2+S_2)$, wherein the one or more edge comparison functions (E) is estimated as: $E(x, y)=(\rho_{xy}+S_3)/(\rho_x\rho_y+S_3)$, wherein $S_1$, $S_2$, and $S_3$ are constants, $\rho_x$ is a standard deviation of edge direction vector, $\rho_{xy}$ is a co-variance of direction vectors corresponding to x and y respectively;

determine whether the measured illuminance of each of the plurality of zones of the object at least matches a threshold of illuminance; and vary intensity of the plurality of illuminators, to improve the illuminance of each of the plurality of zones for which the measured illuminance is below the threshold, to at least match the threshold of illuminance, wherein the one or more hardware processors are configured to vary the intensity of the plurality of illuminators by:

identifying the plurality of illuminators corresponding to each of the plurality of zones for which the measured illuminance is below the threshold, based on a mapping of each of the plurality of zones with the corresponding one or more illuminators;

determining extent to which the intensity of each of the identified one or more illuminators is required to be varied to improve the illumination in the corresponding zone to at least match the threshold of illuminance, wherein the step of determining whether or not to control intensity of each of the IR emitters, based on a difference in the measured illumination and the threshold of illuminance, serves as a feedback mechanism allowing control of the intensity of the IR emitters only when the measured illuminance of at least one of the zone does not match the threshold of illuminance;

generating a control signal to vary the intensity of the one or more of the plurality of illuminators, based on the determined extent to which the intensity of each of the identified one or more illuminators is required to be varied, wherein zone-wise estimated control signals are used to vary and adapt the intensity of the IR illuminators; and varying the intensity of each of the identified one or more illuminators, using the generated control signal.

5. The system of claim 4, wherein the one or more edge comparison functions indicate whether a plurality of edges of the binary semantic mask match a threshold of mask.

6. The system of claim 4, wherein the ore fragmentation analysis of the ore material is performed after varying the intensity of the one or more illuminators.

7. One or more non-transitory machine-readable information storage mediums comprising one or more instructions which when executed by one or more hardware processors cause:

obtaining at least one image of an object, wherein the at least one image is captured when the object is illuminated by a plurality of Infrared (IR) illuminators from an IR illuminator array;

pre-processing the at least one image, wherein the pre-processing comprises of a) adjusting contrast, and b) performing normalization, of one or more frames captured in the at least one image;

performing a semantic segmentation of pre-processed at least one image, to extract foreground (FG) data and background (BG) data of the at least one image;

generating a binary semantic mask of the at least one image, wherein the binary semantic mask comprises information on the extracted BG data and the FG data of the at least one image, wherein at least one Region of Interest (RoI) with a FG is identified, based on the data in the binary semantic mask of the at least one image;

performing a full scale segmentation of all objects in each of the ROIs in the FG of the at least one image, wherein when the object is an ore material and application is ore fragmentation analysis, then the full scale segmentation identifies impurities as rock particles, and further to address overlapping un-segmented regions, the steps comprise:

determining bounding boxes, using an additional regional proposal network, and segment out overlapping regions by eroding corresponding boundaries, wherein the determined overlapping regions is annotated with boulders, and corresponding parameters pertains to a boulder count, a mean particle size are evaluated;

constructing an Edge based Structural Similarity Index Metric (ESSIM) matrix from the binary semantic mask, wherein the ESSIM indicates a measured illuminance of each of a plurality of zones in the at least one Region of Interest (RoI) of the object, in terms of a) luminance (L), b) contrast (I), and c) one or more edge comparison functions (E), wherein the luminance (L) is estimated as: $L(x, y)=(2\mu_x\mu_y+S_1)/(\mu_x^2+\mu_y^2+S_1)$, wherein the contrast (I) is estimated as: $C(x, y)=(2\sigma_x\sigma_y+S_2)/(\sigma_x^2+\sigma_y^2+S_2)$, wherein the one or more edge comparison functions (E) is estimated as: $E(x, y)=(\rho_{xy}+S_3)/(\rho_x\rho_y+S_3)$, wherein $S_1$, $S_2$, and $S_3$, are constants, $\rho_x$ is a standard deviation of edge direction vector, $\rho_{xy}$ is a co-variance of direction vectors corresponding to x and y respectively;

determining, whether the measured illuminance of each of the plurality of zones of the object at least matches a threshold of illuminance; and varying, intensity of the plurality of illuminators, to improve the illuminance of each of the plurality of zones for which the measured illuminance is below the threshold of illuminance, to at least match the threshold of illuminance, wherein varying the intensity of the plurality of illuminators comprises:

identifying the plurality of illuminators corresponding to each of the plurality of zones for which the measured illuminance is below the threshold of illuminance, based on a mapping of each of the plurality of zones with the corresponding one or more illuminators;

determining extent to which the intensity of each of the identified one or more illuminators is required to be varied to improve the illumination in the corresponding zone to at least match the threshold of illuminance, wherein the step of determining whether or not to control intensity of each of the IR emitters, based on a difference in the measured illumination and the threshold of illuminance, serves as a feedback mechanism allowing control of the intensity of the IR emitters only when the measured illuminance of at least one of the zone does not match the threshold of illuminance;

generating a control signal to vary the intensity of the plurality of illuminators, based on the determined extent to which the intensity of each of the identified one or more illuminators is required to be varied, wherein zone-wise estimated control signals are used to vary and adapt the intensity of the IR illuminators; and varying the intensity of each of the identified one or more illuminators, using the generated control signal.

8. The one or more non-transitory machine-readable information storage mediums of claim 7, wherein the one or more edge comparison functions indicate whether a plurality of edges of the binary semantic mask match a threshold of mask.

9. The one or more non-transitory machine-readable information storage mediums of claim 7, wherein the ore fragmentation analysis of the ore material is performed after varying the intensity of the one or more illuminators.

* * * * *